(12) United States Patent
Bonetto et al.

(10) Patent No.: US 7,594,963 B2
(45) Date of Patent: Sep. 29, 2009

(54) JOINT COMPOUND COMPOSITION FOR BUILDING ELEMENTS AND METHOD OF PRODUCING A STRUCTURE

(75) Inventors: Christian Bonetto, Cavaillon (FR); Marc Domenech, La Roque sur Pernes (FR); Alain Petit, Isle sur la Sorgue (FR)

(73) Assignee: Lafarge Platres, Avignon (FR)

( * ) Notice: Subject to any disclaimer, the term of this patent is extended or adjusted under 35 U.S.C. 154(b) by 545 days.

(21) Appl. No.: 10/534,231

(22) PCT Filed: Nov. 7, 2003

(86) PCT No.: PCT/FR03/03333

§ 371 (c)(1),
(2), (4) Date: May 6, 2005

(87) PCT Pub. No.: WO2004/043874

PCT Pub. Date: May 27, 2004

(65) Prior Publication Data

US 2006/0048684 A1    Mar. 9, 2006

(51) Int. Cl.
C04B 11/00    (2006.01)
(52) U.S. Cl. .................... 106/778; 106/772
(58) Field of Classification Search ............... 106/2, 106/772, 778
See application file for complete search history.

(56) References Cited

U.S. PATENT DOCUMENTS

| | | |
|---|---|---|
| 1,439,289 A | 12/1922 | Buttress |
| 1,993,472 A | 3/1935 | Borsari-Fischer |
| 2,109,719 A | 3/1938 | Brusse |
| 2,205,423 A | 6/1940 | Lefebure |
| 2,754,795 A | 7/1956 | Enssle |
| 2,770,216 A | 11/1956 | Schock |
| 2,833,139 A | 5/1958 | Bosshard |
| 2,925,631 A | 2/1960 | Larson et al. |
| 3,003,979 A | 10/1961 | Ptasienski et al. |
| 3,180,058 A | 4/1965 | Tillisch et al. |
| 3,256,223 A | 6/1966 | Heijmer |
| 3,284,980 A | 11/1966 | Dinkel |
| 3,303,147 A | 2/1967 | Elden |
| 3,382,119 A | 5/1968 | Henkel |
| 3,411,926 A | 11/1968 | Gogek et al. |
| 3,422,587 A | 1/1969 | Murray |
| 3,576,091 A | 4/1971 | Shull, Jr. et al. |
| 3,630,742 A | 12/1971 | Crawford et al. |
| 3,708,935 A | 1/1973 | Kossuth et al. |
| 3,819,395 A | 6/1974 | Yocum |
| 3,835,074 A | 9/1974 | Desmarais |
| 3,907,725 A | 9/1975 | Forte et al. |
| 3,975,320 A | 8/1976 | Lane et al. |
| 3,984,596 A | 10/1976 | Failmezger |
| 4,018,732 A | 4/1977 | Lakshmanan |
| 4,117,183 A | 9/1978 | Long |
| 4,178,273 A | 12/1979 | Brown |
| 4,205,041 A | 5/1980 | Hymes |
| 4,238,239 A | 12/1980 | Brown |
| 4,287,103 A | 9/1981 | Green et al. |
| 4,294,622 A | 10/1981 | Brown |
| 4,448,639 A | 5/1984 | Long |
| 4,454,267 A | 6/1984 | Williams |
| 4,558,079 A | 12/1985 | Desmarais |
| 4,579,610 A | 4/1986 | Kole et al. |
| 4,657,594 A | 4/1987 | Struss |
| 4,661,164 A | 4/1987 | Severinghaus, Jr. |
| 4,672,787 A | 6/1987 | Murphy |
| 4,686,253 A | 8/1987 | Struss et al. |
| 4,720,303 A | 1/1988 | Soldatos |
| 4,725,477 A | 2/1988 | Kole et al. |
| 4,743,475 A | 5/1988 | Negri et al. |
| 4,820,754 A | 4/1989 | Negri et al. |
| 4,845,152 A | 7/1989 | Palmer |
| 4,859,248 A | 8/1989 | Thaler et al. |
| 4,959,272 A | 9/1990 | Long |
| 4,965,031 A | 10/1990 | Conroy |
| 4,972,013 A | 11/1990 | Koltisko et al. |

(Continued)

FOREIGN PATENT DOCUMENTS

AU    19322/92    1/1993

(Continued)

OTHER PUBLICATIONS

JP 55027807 A (Feb. 28, 1980) Seto Abstract only.*

(Continued)

*Primary Examiner*—Paul Marcantoni
(74) *Attorney, Agent, or Firm*—Buchanan Ingersoll & Rooney PC

(57) ABSTRACT

The present invention relates to a joint compound composition for building elements, particularly paper-faced plasterboards.

This composition comprises:
  a) 50 to 60% of calcium sulphate hemihydrate;
  b) 5 to 15% of an organic binder in powder form; and
  c) 0.05 to 0.2% of a water repellent.

The invention also relates to a method producing a structure, such as a partition, a wall trim or a ceiling.

According to this method:
  building elements are juxtaposed;
  the joint compound composition according to the invention is mixed with water so as to obtain a joint compound;
  the space between the building elements is filled by means of the joint compound obtained above, without using a tape; and
  the joint compound is left to harden.

10 Claims, No Drawings

U.S. PATENT DOCUMENTS

| | | | |
|---|---|---|---|
| 4,988,543 A | 1/1991 | Houle et al. |
| 5,019,195 A | 5/1991 | Skinner |
| 5,039,341 A | 8/1991 | Meyer |
| 5,055,323 A | 10/1991 | Kole et al. |
| 5,079,042 A | 1/1992 | Frings |
| 5,088,260 A | 2/1992 | Barton et al. |
| 5,102,462 A | 4/1992 | Podlas |
| 5,135,805 A * | 8/1992 | Sellers et al. |
| 5,143,757 A | 9/1992 | Skinner |
| 5,207,830 A | 5/1993 | Cowan et al. |
| 5,230,200 A | 7/1993 | Douglas et al. |
| 5,258,069 A | 11/1993 | Knechtel et al. |
| 5,277,712 A | 1/1994 | McInnis |
| 5,334,243 A | 8/1994 | Hyman |
| 5,336,318 A | 8/1994 | Attard et al. |
| 5,487,250 A | 1/1996 | Yount et al. |
| 5,552,187 A | 9/1996 | Green et al. |
| 5,653,797 A | 8/1997 | Patel |
| 5,714,032 A | 2/1998 | Ainsley et al. |
| 5,746,822 A | 5/1998 | Espinoza et al. |
| 5,779,786 A * | 7/1998 | Patel |
| 5,869,166 A | 2/1999 | Caldwell |
| 5,908,521 A | 6/1999 | Ainsley et al. |
| 5,908,821 A | 6/1999 | Labeque et al. |
| 5,922,447 A | 7/1999 | Baig |
| 5,945,198 A | 8/1999 | Deodhar et al. |
| 5,987,835 A | 11/1999 | Santarossa |
| 6,077,966 A | 6/2000 | Matsumura et al. |
| 6,105,325 A | 8/2000 | Zuber et al. |
| 6,106,607 A | 8/2000 | Be et al. |
| 6,165,261 A | 12/2000 | Wantling |
| 6,171,388 B1 | 1/2001 | Jobbins |
| 6,177,180 B1 | 1/2001 | Bodine et al. |
| 6,221,521 B1 | 4/2001 | Lynn et al. |
| 6,238,476 B1 | 5/2001 | Sprinkle |
| 6,268,042 B1 | 7/2001 | Baig |
| 6,436,185 B1 | 8/2002 | Ayambem et al. |
| 6,645,291 B2 | 11/2003 | Ayambem et al. |
| 6,663,979 B2 | 12/2003 | Deodhar et al. |
| 6,673,144 B2 | 1/2004 | Immordino et al. |
| 6,733,581 B2 | 5/2004 | Langford |
| 6,902,615 B2 * | 6/2005 | Shoshany |
| 7,047,701 B2 | 5/2006 | Bonetto et al. |
| 7,048,791 B2 * | 5/2006 | Langford |
| 2001/0023653 A1 * | 9/2001 | Langford |
| 2002/0086114 A1 | 7/2002 | Madsen |
| 2002/0121326 A1 | 9/2002 | Adler et al. |
| 2003/0084633 A1 | 5/2003 | Zuber et al. |
| 2003/0085306 A1 | 5/2003 | John et al. |
| 2003/0113572 A1 | 6/2003 | Deodhar et al. |
| 2003/0153651 A1 | 8/2003 | Bonetto et al. |
| 2004/0154264 A1 | 8/2004 | Colbert |
| 2004/0209074 A1 | 10/2004 | Randall et al. |
| 2004/0216424 A1 | 11/2004 | Zuber et al. |
| 2004/0237436 A1 | 12/2004 | Zuber et al. |
| 2005/0065256 A1 | 3/2005 | Kyte et al. |
| 2005/0119388 A1 * | 6/2005 | Langford |
| 2005/0229519 A1 | 10/2005 | Colbert et al. |
| 2005/0234174 A1 | 10/2005 | Colbert et al. |
| 2005/0246993 A1 | 11/2005 | Colbert et al. |
| 2005/0252128 A1 | 11/2005 | Colbert et al. |
| 2006/0048684 A1 | 3/2006 | Bonetto et al. |
| 2006/0142456 A1 * | 6/2006 | Langford .................... 524/424 |

FOREIGN PATENT DOCUMENTS

| | | |
|---|---|---|
| AU | 719427 | 5/2000 |
| CA | 2259115 | 8/1999 |
| DE | 142 872 | 7/1980 |
| DE | 37 21 668 | 5/1989 |
| DE | 43 24 315 | 10/1994 |
| DE | 4331141 | 3/1995 |
| EP | 0496682 A | 7/1992 |
| EP | 0 521 804 | 1/1993 |
| EP | 0 521 804 B1 | 1/1993 |
| EP | 1 182 235 | 2/2002 |
| FR | 2166536 A | 8/1973 |
| FR | 2 505 908 | 3/1982 |
| FR | 2 736 079 | 3/1997 |
| FR | 2818635 A | 6/2002 |
| FR | 2818968 A | 7/2002 |
| GB | 1513763 | 6/1978 |
| GB | 2228931 A | 9/1990 |
| JP | 60-065197 | 4/1985 |
| JP | 09-109131 | 4/1997 |
| WO | 97/02395 | 1/1997 |
| WO | 99/08979 | 2/1999 |
| WO | 99/48833 A2 | 9/1999 |
| WO | 99/48833 A3 | 9/1999 |
| WO | 99/57371 | 11/1999 |
| WO | 00/06518 | 2/2000 |
| WO | 02/06183 A1 | 1/2002 |
| WO | 02/12144 | 2/2002 |
| WO | 02/058902 | 8/2002 |
| WO | 2005/040475 | 5/2005 |

OTHER PUBLICATIONS

JP 49001622 (Jan. 9, 1974) Akasaka et al. abstract only.*
J.R. Gorman, et al., "Plaster and Drywall Systems Manual," BNI Books, Division of Building News, Inc., Apr. 12, 2003, pp. 240 and 251.
The White Book 1986 Edition, British Gypsum, Apr. 12, 2003.
The White Book, Plasterboard Fixing, Jointing and Decorating, British Gypsum, Apr. 12, 2003.
G.D. Plumb, M.A., Lightweight Partitions Having Improved Low Frequency Sound Insulations, Research and Development Department, 10 pages, Jun. 1995.
9 White, Medium Calcium Carbonate Filler, Georgia Marble Company, May 1996.
Norme Francaise, Methode de Determination d'absorption d'eau, NF Q 03-014, Sep. 1985, pp. 103-108.
Water Absorbency of Bibulous Papers, T 432 om—94, Approved by the Chemical Properties Committee of the Process and Product Quality Division, 1994.
A Marquer D'Une Pierre Blanche . . . , 11 pages.
Pregyplac Deco la nouvelle plaque blanche, Lafarge Platres, Jul. 1995.
Gypsum Plasterboards, Mar. 1995, 30 pages.
Plaques de Platre -Definitions, Exigences et Methodes d'essai, Oct. 2000, 27 pages.
Papier, Cartons et Pates, Norme Europeenne, Dec. 1993, 10 pages.
Ken A. Phillips, et al., Industrial Minerals in Arizona's Wallboard Joint Cement Industry, Jul. 1989, 6 pages.
Ken Phillips, et al., Industrial Minerals in Southern California's Wallboard Joint Cement Industry, Sep. 1989, 6 pages.
Plaques de Parement en Platre, Oct. 1981, 12 pages.
Gypsum Plasterboard—Part 1: Specification for Plasterboard Excluding Material Submitted to Secondary Operations, 1985, 10 pages.
Travaux de Peinture des Batiments, Partie 1: Cahier des Clauses Techniques, 77 pages, 1994.
Dry Lining and Partitioning Using Gypsum Plasterboard, British Standard, 1995, 50 pages.
Sauli Rennes, et al., The Influence of Binders on the Structure and Water Sorption of Coated Paper, pp. 698-703, Jun. 1989.
Technical Data, Calmote Ad, Omya UK, Jan. 1997.
Attagel 50, Engelhard, Jan. 3, 2003.
Engelhard Material Safety Data Sheet, Lawrence Industries, Aug. 19, 1992.
Fordamin Stinnes Logistics, Fordacal S2 Talc, Mar. 2001.
Defoamers for Emulsion Paints and Emulsion Plasters, BYK Chemie, 4 pages.
4 Walocel M Delivery Programme.

Emultex 596, Synthomer International Technology Individual Service, Jul. 2002.

Sil-Cell 35/34, Silbrico Corporation, 2 pages, 1993.

Methocel Cellulose Ethers for Gypsum-Based Building Materials, How Methocel Cellulose Ethers Products Maximise the Performance of Gypsum-based Building Materials, Aug. 1999.

Elotex LIQ2020, Technical Data Sheet, Mar. 14, 2002.

Twinstar Chemicals Limited, Benzoflex 9-88 Plasticiser Dipropyleneglycol Dibenzoate, 5 pages, Jun. 1996.

"ACUMER® 9400—Dispersant for Paper and Paperboard Coatings", Rohm and Haas Company, Special Polymers.

"ACUMER® 9300—Dispersant for Paper and Paperboard Coatings", Rohm and Haas Company, Special Polymers.

George M. Kutcher, Jr., CDT, CSI, "Revisiting the Levels of Gypsum Board Finish", National Gypsum Company, pp. 1-3.

Chemical Abstracts, vol. 103, No. 8, Aug. 26, 1985, Abstract No. 58270z, p. 278; XP 000185205; Abstract of JP 60 065197.

Database WPI, Week 199727, AN 1997-293470, XP002198594, Abstract of JP 09 109131.

Derwent WPI AN 1997-109001, Week 199710, Abstract of WO 9702395.

Derwent WPI AN 1989-016493, Week 198903, English Abstract of DE 3721668.

Derwent WPI AN 1993-002309, Week 199301, English Abstract of EP 0521804.

New Zealand Opposition Paper in Patent No. 527112 dated Dec. 18, 2006.

Decision, Jun. 14, 2005, Appeal No. T 1032/03-3.2.3, and translation thereof.

International Preliminary Examination Report issued in a corresponding PCT Application.

International Search Report and Attached Written Opinion mailed by the International Bureau on Nov. 7, 2005 in corresponding PCT/EP2005/003990.

International Search Report and Attached Written Opinion mailed by the International Bureau on Dec. 8, 2005 in corresponding PCT/EP2005/003990.

Machine Translation DE 4324315 A (1994).

Water Absorbency of Bibulous Papers, T 432 cm—99, TAPPI 1999 (Revised).

Standard Conditioning and Testing Atmospheres for Paper, Board, Pulp Handsheets and Related Products, T 402 sp—03, TAPPI 2003 (Revised).

Dan Eklund, "The Influence of Binders and Pigments upon the K&N Ink Absorption of Coated Papers," No. 9, 1973 Papper och Trä.

* cited by examiner

JOINT COMPOUND COMPOSITION FOR BUILDING ELEMENTS AND METHOD OF PRODUCING A STRUCTURE

The present invention relates to a joint compound composition for building elements, particularly paper-faced plasterboards, and to a method of producing a structure such as a partition, a wall trim or a ceiling.

It is well known to use building panels such as plasterboards for producing partitions and trims for vertical or inclined elements or for producing suspended or non-suspended ceilings.

These plasterboards are generally formed from a core, essentially made of plaster, covered on each of its faces with a sheet serving both as reinforcement and as facing, which sheet may be formed from paper or from inorganic fibres.

European Patent Application published under the number 496 682 discloses a joint compound for filling the joints formed by the contiguous lateral edges of two plasterboards and for forming a tapeless joint. This joint compound comprises, in percentages by weight calculated with respect to all of the dry matter:
   5 to 30% of hemihydrate plaster;
   7 to 25% of polymer as a suspension in an aqueous phase and/or as a redispersible powder;
   if necessary, other additives for adjusting the setting time and/or for adjusting the quality of the paste and/or the adhesion of the joint compound; and
   at least one inner filler in an amount making up the composition to 100%.

Example 15 of that patent application discloses in particular a composition comprising, in parts by weight:
   194 parts of alpha-plaster;
   108 parts of a vinyl acetate/ethylene copolymer stabilized with polyvinyl alcohol and having a solids content of 55%;
   6.6 parts of a vinyl acetate/ethylene copolymer as a redispersible powder;
   0.67 parts of cellulose ether;
   669.3 parts of limestone
   2.25 parts of polyvinyl alcohol;
   0.027 parts of polyacrylamide;
   2.25 parts of clay;
   0.045 parts of white Portland cement;
   1.12 parts of gypsum+starch (50/50); and
   0.125 parts of hydrolytically degraded keratin.

U.S. Pat. No. 5,653,797 discloses a composition for filling the joints formed by the adjacent edges of panels formed from plasterboards, this composition comprising:
   (a) calcium sulphate hemihydrate;
   (b) water in an amount sufficient to adjust the viscosity of the composition;
   (c) a set retarder comprising a composition based on a polymer comprising acrylamide and acrylic acid monomers; and
   (d) a set accelerator comprising a metal salt comprising acid cations.

That patent mentions the possible use of a binder such as a latex or polyvinyl alcohol.

Table II of column 8 of that patent indicates a composition comprising:
   20 to 30% of calcium sulphate hemihydrate;
   1 to 4% of a latex-type binder;
   1 to 10% of perlite;
   10 to 50% of limestone;
   0.5 to 4% of clay;
   0.1 to 1% of a thickener;
   0.5 to 3% of talc;
   1 to 4% of mica;
   0.01 to 1% of the particular retarder described above;
   0.01 to 2% of the particular accelerator described above;
   0.01 to 1% of a preservative; and
   20 to 30% of water.

However, when this composition hardens, it undergoes excessive shrinkage.

International Application published under the number WO 99/48833 discloses a composition that can be used for filling joints between adjacent plasterboards. This composition causes hydraulic setting when it is mixed with an effective amount of a set accelerator and it comprises a material such as plaster and a particular retarder based on a sulphonated polymer or copolymer.

Example 11 of that application discloses a composition for filling joints having the following formulation (in % by weight):
   35.9% of calcium sulphate hemihydrate;
   4.1% of a vinyl acetate/ethylene copolymer, in 50% water;
   7.1% of perlite;
   0.3% of cellulose ether;
   8.1% of limestone;
   2.6% of wollastonite;
   2.6% of kaolin;
   0.1% of lime;
   1.0% of retarder; and
   38.3% of water.

This composition also has the major drawback of resulting in excessive shrinkage.

The joint compounds or compositions that have been described have the drawback of being unsatisfactory because they do not have all the following qualities taken together:
   good workability;
   a colour compatible with that of the building elements for which they are intended; and
   the ability to obtain a joint having zero or almost zero shrinkage and good mechanical properties (hardness, tensile strength, compressive strength, impact strength, and slight deformability or elasticity in order to prevent cracking).

Furthermore, the compositions of the aforementioned documents U.S. Pat. No. 5,653,797 and WO 99/48833 have the particular feature of containing a powerful retarder that blocks the hydration of the calcium sulphate hemihydrate. It is therefore the user who adds an accelerator in order for this hydration to start. This entails difficulties when the joint compound is being used on a work site, since there is a risk of the user not adding the correct dose of accelerator.

In addition, these compositions change over time. Depending on the time that has elapsed since the preparation of the composition, the same amount of accelerator added at the moment of application does not have the same effects. It follows that there is uncertainty as regards the hydraulic setting in the sense that it is not possible to know precisely when this setting will take place.

Moreover, other problems arise when the building element is a plasterboard covered with a paper facing:
   it is necessary, on the one hand, for the joint compound to have good adhesion to the paper facing and, on the other hand, for the adhesion of a wallpaper to the joint to be also good but not excessive, so as to make it possible to strip wallpaper one or more times without either tearing or degrading the joint compound; and the joint compound must have a water and/or paint absorption as close as possible to that of the facing paper, so as to avoid having to apply a coat of primer before wallpapering or painting.

The aim of the invention is therefore to provide a tapeless joint compound composition which, after mixing with water, gives a joint compound that has the abovementioned qualities and characteristics. It is based on the discovery that, in order for a joint compound to be satisfactory, it is necessary for it to contain calcium sulphate, a binder and a water repellent, and to do so in well-defined proportions.

Thus, the subject of the invention is a joint compound composition comprising:
  a) 50 to 60% of calcium sulphate hemihydrate;
  b) 5 to 15% of an organic binder in powder form; and
  c) 0.05 to 0.2% of a water repellent.

Such a composition, after mixing with water, therefore gives a hydraulic setting joint compound that can be used by itself, that is to say it is both a filling joint compound and a finishing joint compound, and makes it possible to produce a joint without having to use a tape.

The subject of the invention is also a method of producing a structure, in which:
  building elements are juxtaposed;
  the joint compound composition according to the invention is mixed with water so as to obtain a joint compound;
  the space between the building elements is filled by means of the joint compound obtained above, without using a tape; and
  the joint compound is left to harden.

Finally, the invention relates to a joint as obtained by implementing this method.

Other features and advantages of the invention will become apparent on reading the following description.

DETAILED DESCRIPTION OF THE INVENTION

Composition According to the Invention

The general composition of the invention was given above.

According to a preferred embodiment of the invention, the composition furthermore includes:
  d) from 1 to 10% of a lightening agent (light weight agent)

According to one particularly advantageous embodiment of the invention, the composition comprises:
  a) 50 to 60% of calcium sulphate hemihydrate;
  b) 5 to 10% of an organic binder;
  c) 0.07 to 0.15% of a water repellent; and
  d) 3 to 7% of a lightening agent.

Of course, the balance to 100% consists of one or more fillers and optionally one or more additives chosen from water retainers, thickeners, workability agents, dyes or pigments, set retarders and set accelerators.

Preferably, a calcium sulphate hemihydrate of the alpha type is used since this allows the necessary amount of water for mixing the composition to be reduced.

The organic binder has the function of softening the calcium sulphate in the joint and of obtaining good mechanical properties. As binder, it is possible to use copolymers of vinyl esters and of ethylene monomers, such as ethylene/vinyl acetate (EVA) copolymers, whether plasticized or unplasticized, ethylene/vinyl versatate copolymers and vinyl acetate/vinyl versatate copolymers, polyacrylics, vinyl acetate/acrylic copolymers, styrene/acrylic and styrene/butadiene copolymers, vinyl acetate/vinyl versatate/acrylic and vinyl acetate/vinyl versatate/vinyl maleate terpolymers, acrylic terpolymers and blends thereof.

The vinyl copolymers may be stabilized with polyvinyl alcohol.

The organic binder is also preferably used in the form of a redispersible powder.

As water repellent that can be used in the joint compound composition according to the invention, it is possible to choose, in particular, a fatty acid, a fatty acid salt, a wax or a silicone derivative.

Preferably, oleic acid or stearic acid are used as fatty acid.

As fatty acid salt, alkali metal or alkaline-earth metal salts are preferred, particularly sodium, potassium, magnesium or calcium salts.

As silicone derivative, mention may be made of siliconates, silanes, hydrogenated silicone oils, silicone emulsions, amino silicone emulsions, alkylsiloxane resins, such as hydrogenomethylpolysiloxane and polydimethylaminosiloxane, and blends thereof.

The water repellent most particularly preferred is chosen from oleic acid, stearic acid, sodium oleate and sodium stearate.

As lightening agent suitable for the invention, mention may be made of perlite, glass microbeads and polymer microspheres.

Preferably, the lightening agent is non-water-repellent expanded perlite.

It is also possible to use at least one filler such as, for example, limestone, magnesium carbonate, calcium magnesium carbonate (dolomite), magnesium hydroxide, silica, natural or synthetic gypsum, or else ground natural or synthetic anhydrite. Preferably, limestone is used.

The joint compound composition according to the invention may also include one or more water retainers that may be chosen from cellulose ethers, particularly methyl cellulose (MC), carboxymethyl cellulose (CMC), hydroxyethyl cellulose (HEC), ethylhydroxyethyl cellulose (EHEC), methylhydroxypropyl cellulose (MHPC) and methylhydroxyethyl cellulose (MHEC).

These water retainers may also have a viscosity-modifying action and therefore have a positive influence on the quality of the paste.

Optionally, the cellulose ethers may be partly substituted with or else accompanied by naturally occurring polycarbohydrate derivatives that participate in the rheology of the paste, such as galactomanans, polysaccharides, xanthan, guar derivatives, etc. The commercially available "modified" cellulose ethers are often the aforementioned molecules with other wetting agents or thickeners: they may be highly suitable for the invention. However, it is possible to use other water-retaining or viscosity-modifying agents, such as starch ethers or agents which, in addition to their main function, exhibit a sufficient water-retaining action, such as polyvinyl alcohol.

The joint compound composition according to the invention may furthermore include one or more thickeners, which may be polyacrylamides, CMC, starch derivatives, or clays such as attapulgite, sepiolite, montmorillonite and bentonite.

Preferably, the thickener is a polyacrylamide.

The composition according to the invention may also include one or more workability agents. This workability agent may be a plasticizer, a wetting agent or a slip agent.

As plasticizer suitable for the invention, mention may be made of sulphonated polymers, preferably agents based on sulphonated melamine-formaldehyde.

As wetting agent suitable for the invention, mention may be made of alkyl sulphates, such as sodium lauryl sulphate, alkylaryl sulphonates or phosphate derivatives.

As slip agent suitable for the invention, mention may be made of talc or mica. Because of their lamellar morphologies, these agents promote slip of the spreader when jointing and help to reduce shrinkage.

The composition according to the invention may also contain one or more colorants that may be chosen, for example, from titanium dioxide and optical brighteners.

The composition according to the invention may also contain additives for adjusting the setting time, these being set retarders or set accelerators.

In general, a pair of agents, one of which is an accelerator and the other a retarder, is added.

Among set accelerators that may be suitable for the invention, mention may be made of sulphates. Preferably, gypsum is used in the form of a powdered mixture of gypsum and starch, the gypsum always retaining the same ability to accelerate the setting of the plaster thanks to the starch, which preserves it from ageing. Thus, the setting of the joint compound is made insensitive to external gypsum contaminations, especially those that may be present in the form of setting nuclei in the plasterer's trough or applicator.

Among set retarders, mention may be made of agents based on hydrolytically degraded keratin, hydroxycarboxylic acids, such as tartaric acid and citric acid, salts of these acids, and calcium monophosphate. These agents may be employed in proportions that vary according to the proportions of hemihydrate plaster and of accelerator.

Advantageously, the proportions of accelerator and of retarder are adjusted in such a way that the hardening time is short enough to allow the jointing to be completed during the day.

Various other additives may optionally be added to the composition according to the invention. Thus, it is possible to add to the composition an agent capable of bringing the pH of the joint compound to a basic pH. The basic agent makes it easier for the water-retaining agent, mainly when it is cellulose ether, to dissolve and consequently favours build-up of viscosity. As basic agent, an inorganic agent may be used, preferably "white" Portland cement, that is to say Portland cement devoid of iron oxide, or lime.

Also preferably, the amount of basic agent needed to achieve a pH of greater than or equal to 8 is introduced into the joint compound.

Preparation of the Composition According to the Invention

The joint compound composition according to the invention is prepared by blending its constituents in any order, preferably until a homogeneous powder is obtained.

Although the constituents of the composition according to the invention are not necessarily all in powder form, once they have been blended the composition according to the invention is generally and overall in the form of a powder.

In general, the particles making up the powder have a diameter of at most 200 microns.

Method of Producing a Structure According to the Invention

According to the invention, to produce a structure, panels or building elements are juxtaposed, the joint compound composition according to the invention is mixed with water, so as to obtain a joint compound, and then the space between the building elements is filled by means of the joint compound obtained, without using a tape, and the joint compound is left to harden.

The mixing is generally carried out with a mass ratio of water to joint compound composition ranging from 40 to 50%.

The method according to the invention applies in particular to the production of a structure by means of plasterboards coated with a paper facing.

These plasterboards may have edges of various geometries, and in particular feathered, rounded or both rounded and feathered edges.

Joint According to the Invention

By implementing the method according to the invention, it is therefore possible to obtain a satisfactory joint.

Such a joint also has the advantage of allowing the application of paint, by all suitable painting techniques used by those skilled in the art, particularly by applying the paint with a roller, a brush or by airless spraying.

EXAMPLES

The following examples illustrate the present invention without, however, limiting the scope thereof.

Example 1

A joint compound composition E according to the invention was prepared, together with three joint compound compositions in powder form, A, B and C, outside the scope of the invention, by way of comparison.

The corresponding formulations are given in the following table, in which the values indicated correspond to parts by weight:

| Composition | | JOINT COMPOUND | | | |
|---|---|---|---|---|---|
| | | E (inv.) | A (comp.) | B (comp.) | C (comp.) |
| Plaster | alpha hemihydrate | 500.0 | 500.0 | 500.0 | 500.0 |
| Organic binder | Vinyl acetate/ ethylene copolymer[(1)] | — | 40.0 | 40.0 | 40.0 |
| | Vinyl acetate/ vinyl versatate copolymer[(2)] | 60.0 | — | — | — |
| Water repellent | Silicone powder | — | — | 2.0 | — |
| | Sodium stearate | 1.0 | — | — | 1.0 |
| | White cement[(3)] | — | 100.0 | — | — |
| Lightening agent | Perlite[(4)] | 40.0 | 40.0 | 40.0 | 40.0 |
| Water retainer | MHPC | 3.0 | 3.0 | 3.0 | 3.0 |
| Filler | Limestone | 370.9 | 291.9 | 389.9 | 390.9 |
| Workability agent | Talc | 20.0 | 20.0 | 20.0 | 20.0 |
| Additives | Thickener, retarder, accelerator, colorant | qsp 1000 | qsp 1000 | qsp 1000 | qsp 1000 |

[(1)]stabilized with polyvinyl alcohol;
[(2)]stabilized with polyvinyl alcohol;
[(3)]White Portland cement;
[(4)]Non-water-repellent expanded.

Example 2

Joint compounds were prepared by adding water, in an amount of 42 g of water per 100 g of composition, to compositions E, A, B and C of Example 1. The joint compounds thus obtained were then tested in order to produce a joint between two paper-faced plasterboards.

Composition A did not give satisfactory results, especially because the use of cement gives the paste a high pH, thereby causing hydrolysis of the starch-based wallpaper adhesive and, consequently, the wallpaper does not adhere.

Composition B allowed good application of paint to the joint and good adhesion of the wallpaper. However, it was very difficult to mix the composition, probably because the silicone is very poorly wetted. Such mixing therefore cannot be carried out on a work site.

Composition C allowed good mixing. However, when applying paint, the joint absorbed the paint too quickly and the adhesion of the wallpaper to this joint compound was insufficient because of the excessively large porosity of the joint, which absorbed an excessive amount of adhesive.

Composition E, which met all the formulation criteria of the invention, mixed normally and gave good bonding, and the binder created a sufficiently thick film for application of the paint or for bonding of the wallpaper. The alpha-type plaster used made it possible to reduce the water required and, consequently, the shrinkage on drying. The perlite made the joint compound easy to rub down and also reduced the shrinkage. This joint compound was therefore satisfactory from all standpoints.

The invention claimed is:

1. A joint compound composition comprising:
   a) 50 to 60% of calcium sulphate hemihydrate;
   b) 5 to 15% of an organic binder in powder form; and
   c) 0.05 to 0.2% of a water repellent selected from the group consisting of oleic acid, stearic acid and their alkali metal or alkaline earth metal salt.

2. The joint compound composition according to claim 1, which further includes:
   d) 1 to 10% of a lightening agent.

3. The joint compound composition according to claim 1, wherein the composition comprises 5 to 10% of the organic binder; 0.07 to 0.15% of the water repellent; and 3 to 7% of a lightening agent.

4. The joint compound composition according to claim 1, wherein the calcium sulphate hemihydrate is of the alpha form.

5. The joint compound composition according to claim 1, wherein the organic binder is selected from the group consisting of copolymers of vinyl esters and of ethylene monomers, polyacrylics, vinyl acetate/acrylic copolymers, styrene/acrylic and styrene/butadiene copolymers, vinyl acetate/vinyl versatate/acrylic and vinyl acetate/vinyl versatate/vinyl maleate terpolymers, acrylic terpolymers and blends thereof.

6. The joint compound composition according to claim 2, wherein the lightening agent is perlite.

7. The joint compound composition according to claim 2, wherein the lightening agent is non-water-repellent expanded perlite.

8. The joint compound composition according to claim 1, wherein the composition is in the form of a powder.

9. The joint compound composition according to claim 1, wherein the composition is in the form of a powder composed of particles having a diameter of at most 200 microns.

10. The joint compound composition according to claim 1, wherein the water repellent is selected from the group consisting of oleic acid and its alkali metal or alkaline earth metal salt.

* * * * *

UNITED STATES PATENT AND TRADEMARK OFFICE
CERTIFICATE OF CORRECTION

PATENT NO. : 7,594,963 B2 Page 1 of 1
APPLICATION NO. : 10/534231
DATED : September 29, 2009
INVENTOR(S) : Bonetto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Twenty-eighth Day of September, 2010

David J. Kappos
*Director of the United States Patent and Trademark Office*